United States Patent [19]

Bolhuis

[11] Patent Number: 4,825,443
[45] Date of Patent: Apr. 25, 1989

[54] CIRCUIT ARRANGEMENT FOR STARTING AND OPERATING A GAS DISCHARGE LASER

[75] Inventor: Pieter J. Bolhuis, Eindhoven, Netherlands

[73] Assignee: U.S. Philips Corp., New York, N.Y.

[21] Appl. No.: 606,745

[22] Filed: May 3, 1984

[30] Foreign Application Priority Data

May 18, 1983 [NL] Netherlands .................. 8301761

[51] Int. Cl.⁴ .............................................. H01S 3/00
[52] U.S. Cl. ...................................... 372/38; 315/58; 307/318
[58] Field of Search ................. 372/38, 61, 33, 55, 372/83, 99; 307/268, 318, 324, 291; 219/121 A, 121 B; 338/20, 72; 315/58, DIG. 5, 341, 245

[56] References Cited

U.S. PATENT DOCUMENTS 3,447,098 5/1969 Eckberg .................................. 372/99
3,601,653 9/1971 Golser .................................... 315/341

OTHER PUBLICATIONS

Gupta et al.; "A Circuit for Simultaneous Striking of the Coupled Plasma Tubes of a Coaxial cw-$CO_2$ Laser"; J. Phys. E: Sci. Inst., vol. 13, 1980, p. 1267.
Wheeler; "Power Supplies for Continuous Gas Lasers and Similar Discharges"; J. Phys. E: Sci. Inst., vol. 4, 1971; p. 159.
Boylestad et al.; "Electronic Devices & Circuit Theory"; second-edition 1978, Prentice-Hall.
Howells et al.; "A Medium PRF UV Preionized IEA $CO_2$ Laser"; J. Phys. E: Sci. Inst., vol. 14, 1981.
Fortin; "Prelim. Measur. of 2 TEA Pressure $CO_2$ Laser", Canad. Jour. of Phys., vol. 49, 1971, pp. 257-264.
Goldsbourough; Laser Handbook; "Laser Devices and Techniques", pp. 612-613.

Primary Examiner—Leon Scott, Jr.
Attorney, Agent, or Firm—Bernard Franzblau

[57] ABSTRACT

A circuit arrangement for starting and operating a gas discharge laser comprises two supply lines (4,5) adapted to supply a direct current to the gas discharge laser (1). A ballast resistor (7) is connected in at least one of the supply lines. By shunting the ballast resistor with means (8) through which a starting current flows during the starting phase of the gas discharge laser, a large current flows through the laser during said starting phase so that the ionization in the laser starts readily. As a result the ignition of the laser is more reliable. The means may be a capacitor or a V.D.R.

17 Claims, 1 Drawing Sheet

CIRCUIT ARRANGEMENT FOR STARTING AND OPERATING A GAS DISCHARGE LASER

The invention relates to a circuit arrangement for starting and operating a gas discharge laser in which said circuit arrangement comprises two supply lines having a ballast resistor in at least one of them. The supply lines are destined to supply a direct current to the gas discharge laser.

Gas discharge lasers have a very wide field of application. They are used, for example, in interferometers and in devices for reading a record carrier on which information is provided in an optically readable information structure. Such a reading device is described, for example, in Philips Technisch Tijdschrift 33, No. 7, pp. 194–197, 1973.

A circuit arrangement of the type mentioned in the opening paragraph is known from the "Laser Handbook", F. T. Arrecchi and E. O. Schulz - Du Bois, North-Holland Publ. Co. Amsterdam 1982, pp. 611–614.

The discharges of such gas discharge lasers have a negative resistance characteristic. In order to nevertheless obtain a stable discharge, a ballast resistor is incorporated in one of the supply lines of the laser, which resistor has to be larger than the negative resistance of the discharge. For starting the gas discharge laser, an electric voltage is used which is a few times larger than the operating voltage of the laser. The starting current through the gas discharge laser is restricted by the ballast resistor. Said restriction of the starting current results in an unsatisfactory ignition of the laser so that the starting operation has to be repeated. As a result of this a number of current peaks occur in the starting phase which may cause disturbances in the electronic components of the device in which the laser is used, for example, a device for reading an information carrier.

It is therefore an object of the invention to provide a circuit arrangement for starting and operating a gas discharge laser with which it is possible to start the laser as rapidly as possible so as to prevent the disturbances.

According to the invention, such a circuit arrangement of the type described in the opening paragraph is characterized in that the ballast resistor is shunted by circuit through which a starting current flows during the starting phase of the gas discharge laser.

The invention is based on the recognition of the fact that the ionization in the laser starts readily and the ignition of the laser becomes reliable by causing a large current to flow through the gas discharge laser during the starting phase.

The means may in principle be a switch which is closed only during the starting phase. However, this solution is not very practical.

A first preferred embodiment of the circuit arrangement in accordance with the invention is characterized in that the means comprise a capacitor of a few tens to a few hundred pF (picofarad). The value of the capacitor is not very critical and can simply be established experimentally in any type of laser comprising a damping resistor or not.

For limiting the starting current, a resistor of a few kiloohm to a few tens of kiloohms may be incorporated in series with the capacitor in the shunting circuit.

A second preferred embodiment of the circuit arrangement in accordance with the invention is characterized in that the means comprise at least a voltage-dependent resistor (a so-called V.D.R.=Voltage-Dependent Resistor). During the starting phase such a current starts to flow through the ballast resistor that the voltage across said resistor becomes so large that the resistance value of the V.D.R. decreases and the current therethrough increases considerably, which current forms the starting current of the laser. After staring the laser the voltage across the ballast resistor changes in value such that the resistance value of the V.D.R. becomes so high that it conveys hardly any current any more. Two or more V.D.R.'s may also be used in series and/or parallel.

For restricting the starting current a damping resistor may be incorporated in series with the gas discharge laser and the shunted ballast resistor. In order to eliminate effects of stray capacitances it is advisable to arrange said damping resistor close to the laser.

The invention will now be described in greater detail with reference to the accompanying drawing, in which.

Figure 1:
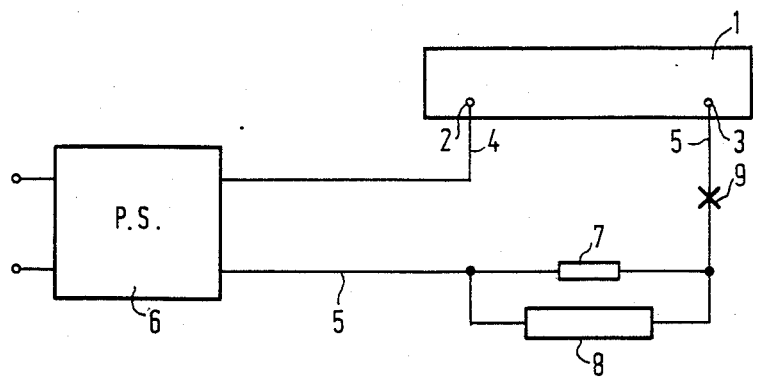
FIG. 1 shows diagrammatically a circuit arrangement according to the invention.

The gas discharge laser 1 (for example a He-Ne gas discharge laser as used in the VLP-player of Philips) comprises a cathode 2 and an anode 3 in the gas-filled envelope of the gas discharge laser. The supply lines 4 and 5 are connected to the cathode 2 and anode 3, respectively, and pass through the wall of the envelope of the laser and are connected to a high voltage source 6 (for example 2–5 kV), namely a direct voltage source. A ballast resistor 7 of, for example, 66 kOhm is connected in the supply line 5. Said ballast resistor is shunted in the circuit arrangement according to the invention by means 8 through which a starting current flows during the starting phase of the laser. In this case two V.D.R.'s in series are chosen for said means (2×V.D.R. type 2322 564 90 015 Comp. Mat. Part 11, May 1982, Philips Data Handbook, pp A35 to A38, inclusive). It is also possible, however, to use a capacitor of 30 pF, or a capacitor of 470 pF with a resistor of 10 kOhm in series. These means may also use a so-called "breakdown element", e.g. a Zener diode or a number of Zener diodes in series.

If a damping resistor of, for example, 22 kOhm is incorporated at point 9 in the supply line 5, the starting current is even further limited.

Figure 2:
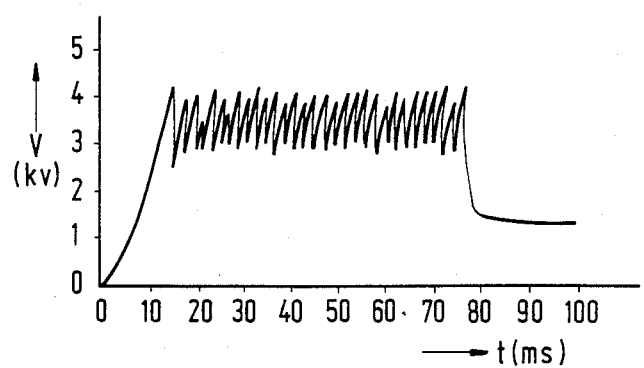
FIG. 2 shows the measured voltage variation across the laser as a function of time during the starting phase without the use of the circuit arrangement according to the invention.

FIG. 2 shows the measured voltage variation V (kV) as a function of the time (ms) during the starting phase of the laser in a supply circuit in which the means 8 are absent. The voltage across the laser increases to 4 kV. Because the starting current at said breakdown voltage is limited too much, the ionization in the gas discharge laser does not start well and the laser does not start. The voltage which has collapsed during the starting attempt, as a result of an increased current, to below 3 kV again increases to 4 kV and a subsequent starting attempt begins. The current peaks occurring during said starting attempts may cause disturbances in the electronic components of the device in which the laser is used. Only after 80 ms has the laser ignited and does the voltage drop to the operating voltage of 1.2 of 1 kV.

Figure 3:
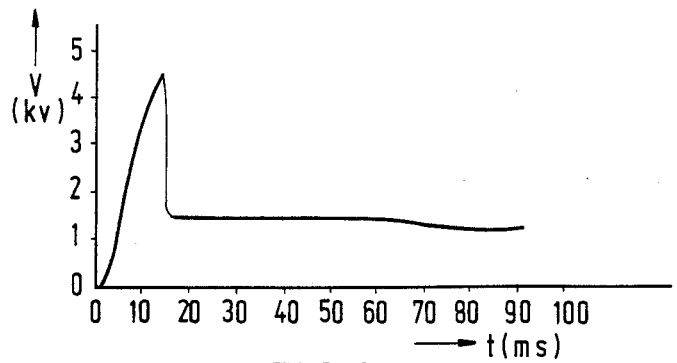
FIG. 3 shows a voltage variation measured in a manner comparable to FIG. 2 with the use of the circuit arrangement according to the invention.

FIG. 3 shows a voltage variation measured in a comparable manner to FIG. 2 in a supply circuit according to the invention having a V.D.R. in shunt with the ballast resistor 7. The voltage across the laser increases to 4.5 kV after which the laser ignites at once and the voltage returns to the operating voltage of 1.2 kV. Because in this case no repeated current peaks occur as a result of the use of a V.D.R. across the ballast resistor, no disturbances occur in the electronic components of the device.

What is claimed is:

1. A circuit arrangement for starting and operating a gas discharge laser having a starting phase and an operating phase comprising, two supply lines for supplying a direct current to the gas discharge laser, a ballast resistor connected in at least one of the supply lines, and circuit means in shunt with the ballast resistor through which a starting current flows during the starting phase of the gas discharge laser.

2. A circuit arrangement as claimed in claim 1, characterized in that the circuit means comprise a capacitor of a few tens to a few hundred pF.

3. A circuit arrangement as claimed in claim 2 further comprising a damping resistor connected in series with the gas discharge laser and the ballast resistor.

4. A circuit arrangement as claimed in claim 2, further comprising a resistor connected in series with the capacitor in the shunt circuit.

5. A circuit arrangement as claimed in claim 4 further comprising a damping resistor connected in series with the gas discharge laser and the ballast resistor.

6. A circuit arrangement as claimed in claim 1, characterized in that the circuit means comprise at least a voltage-dependent resistor.

7. A circuit arrangement as claimed in claim 6 further comprising a damping resistor connected in series with the gas discharge laser and the ballast resistor.

8. A circuit arrangement as claimed in claim 1 further comprising a damping resistor connected in series with the gas discharge laser and the shunted ballast resistor.

9. An optical reading device comprising: a record carrier on which information is provided in an optically readable information structure, and a gas discharge laser having an electric supply which comprises a circuit arrangement as claimed in claim 1.

10. Apparatus for starting and operating a gas discharge laser having a starting phase and an operating phase comprising: a pair of input terminals for a source of direct current, a ballast resistor connected in series circuit with the gas discharge laser across said pair of terminals, and a circuit device connected in shunt with the ballast resistor to provide a path through which a starting current can flow during the starting phase of the gas discharge laser, said circuit device having an electrical characteristic such that it passes a high current during the starting phase and a relatively low current during the operating phase of the gas discharge laser.

11. Apparatus as claimed in claim 10 wherein the circuit device comprises at least one voltage dependent resistor which exhibits a low resistance during the starting phase and in response to a change in voltage which occurs in the operating phase increases its resistance to a relatively high value.

12. Apparatus as claimed in claim 11 further comprising a damping resistor connected in series with the gas discharge laser and the shunt combination of the ballast resistor and the circuit device.

13. Apparatus as claimed in claim 10 wherein the circuit device comprises a small capacitor having a capacitance in the order of a few hundred picofarad or less.

14. Apparatus as claimed in claim 13 wherein the circuit device further comprises a resistor connected in series with the capacitor.

15. Apparatus as claimed in claim 13 further comprising a damping resistor connected in series with the gas discharge laser and the shunt combination of the ballast resistor and the circuit device.

16. Apparatus as claimed in claim 10 further comprising a damping resistor connected in series with the gas discharge laser and the shunt combination of the ballast resistor and the circuit device.

17. Apparatus as claimed in claim 10 wherein the shunt combination includes only passive circuit elements.

* * * * *